(12) United States Patent
MacFarlane et al.

(10) Patent No.: US 12,494,906 B2
(45) Date of Patent: Dec. 9, 2025

(54) SYSTEMS AND METHODS FOR IMPLEMENTING STRUCTURES FOR PHYSICAL UNCLONABLE FUNCTIONS

(71) Applicant: Anametric, Inc., Austin, TX (US)

(72) Inventors: Duncan L. MacFarlane, Dallas, TX (US); Mitchell A. Thornton, Dallas, TX (US); William V. Oxford, Austin, TX (US); Hiva Shahoei, Dallas, TX (US); Evan Jacob Stewart, Dallas, TX (US); Stephen Keith Heinrich-Barna, Lucas, TX (US)

(73) Assignee: ANAMETRIC, INC., Austin, TX (US)

( * ) Notice: Subject to any disclaimer, the term of this patent is extended or adjusted under 35 U.S.C. 154(b) by 94 days.

(21) Appl. No.: 18/364,515

(22) Filed: Aug. 3, 2023

(65) Prior Publication Data

US 2024/0223361 A1     Jul. 4, 2024

Related U.S. Application Data

(60) Provisional application No. 63/395,736, filed on Aug. 5, 2022.

(51) Int. Cl.
*H04L 9/08* (2006.01)
*H04L 9/32* (2006.01)
*G06F 21/73* (2013.01)

(52) U.S. Cl.
CPC .......... *H04L 9/0866* (2013.01); *H04L 9/3247* (2013.01); *H04L 9/3278* (2013.01); *G06F 21/73* (2013.01); *H04L 2209/12* (2013.01)

(58) Field of Classification Search
CPC ... H04L 9/0866; H04L 9/3247; H04L 9/3278; G06F 21/73
See application file for complete search history.

(56) References Cited

U.S. PATENT DOCUMENTS

| | | | |
|---|---|---|---|
| 10,539,783 B1* | 1/2020 | Birch | G06F 30/20 |
| 12,170,736 B2 | 12/2024 | Thornton et al. | |
| 2011/0069972 A1 | 3/2011 | Wiseman et al. | |
| 2011/0236021 A1 | 9/2011 | Presi | |
| 2015/0215115 A1 | 7/2015 | Pikus | |
| 2015/0229482 A1* | 8/2015 | Pinkse | H04L 9/0852 380/28 |
| 2016/0377423 A1* | 12/2016 | Eilers | H04L 9/00 356/601 |
| 2017/0134174 A1 | 5/2017 | Cambou | |
| 2017/0164191 A1 | 6/2017 | Orcutt | |

(Continued)

OTHER PUBLICATIONS

Akriotou, M., Fragkos, A., and Syvridis, D., Photonic Physical Unclonable Functions: From the Concept to Fully Functional Device Operating in the Field, arXiv:2002.12618 [cs.CR], 17 pgs., at https://arxiv.org/pdf/2002.12618.pdf, (last accessed Mar. 21, 2021).

(Continued)

*Primary Examiner* — Ellen Tran
(74) *Attorney, Agent, or Firm* — SPRINKLE IP LAW GROUP

(57) ABSTRACT

Embodiments of PUF systems utilizing photonic circuits to generate a PUF signature based on a state of polarization of photons are disclosed. Embodiments of such PUFs may comprise substantially the same circuitry that may be operated in the classical domain or the quantum domain.

19 Claims, 8 Drawing Sheets

(56) References Cited

U.S. PATENT DOCUMENTS

| | | | |
|---|---|---|---|
| 2019/0156066 | A1* | 5/2019 | Foster ............... G06F 21/72 |
| 2020/0052893 | A1 | 2/2020 | Lu et al. |
| 2020/0186350 | A1 | 6/2020 | Wentz et al. |
| 2022/0069990 | A1* | 3/2022 | Ryckman ............ G06F 21/75 |
| 2022/0076155 | A1 | 3/2022 | MacFarlane et al. |
| 2022/0376934 | A1 | 11/2022 | Thornton et al. |
| 2025/0062921 | A1 | 2/2025 | Thornton et al. |

OTHER PUBLICATIONS

Bowman, Keith A., Duvall, Steven G., and Meindl, James D., Impact of Die-to-Die and Within-Die Parameter Fluctuations on the Maximum Clock Frequency Distribution for Gigascale Integration, IEEE Journal of Solid-State Circuits, vol. 37, No. 2, Feb. 2002, pp. 183-190.

Boning, Duane S., and Nassif, Sani, Models of Process Variations in Device and Interconnect, in A. Chandrakasan, W. Bowhill, and F. Fox (eds.), Design of High Performance Microprocessor Circuits, Chapter 6, IEEE Pres, 2000, 34 pgs.

Gassend, Blaise, Clarke, Dwaine, Van Dijk, Marten and Devadas, Srinivas, Silicon Physical Random Functions, in proc. ACM Conf. on Computer and Communications Security, Nov. 2002, pp. 149-160.

Huntoon, Nathan R., Christensen, Marc P., Macfarlane, Duncan L., Evans, Gary A., and Yeh, C.S., Integrated Photonic Coupler Based on Frustrated Total Internal Reflection, Applied Optics, vol. 4, No. 30, Oct. 20, 2008, pp. 5682-5690.

Korenda, Ashwija R., Afghah, Fatemeh, Cambou, Bertrand, and Philabaum, Christopher, A Proof of Concept SRAM-based Physically Unclonable Function (PUF) Key Generation Mechanism for IoT Devices, in proc. Workshop on Security, Trust, and Privacy in Emerging Cyber-Physical Systems, SECON 2019, 8 pgs.

Krishnamoorthy, Ashok V., Zheng, Xuezhe, Li, Guoliang, Yao, Jin, Pinguet, Thierry, Mekis, Attila, Thacker, Hiren, Shubin, Ivan, Luo, Ying, Raj, Kannan, and Cunningham, John E., Exploiting CMOS Manufacturing to Reduce Tuning Requirements for Resonant Optical Devices, IEEE Photonics Journal, vol. 3, No. 3, Jun. 2011, pp. 567-579.

Liu, Ke, Huang, Hui, Mu, Si Xuan, Lin, Hai, and Macfarlane, Duncan L., Ultra-compact Three-Port Trench-Based Photonic Couplers in Ion-Exchanged Glass Waveguides, Optics Communications, 309, 2013, pp. 307-312.

Majzoobi, Mehrdad, Koushanfar, Farinaz and Potkonjak, Miodrag, Lightweight Secure PUFs, in proc. IEEE/ACM International Conference on Computer-Aided Design, Nov. 2008, pp. 670-673.

Pappu, Srinivasa Ravikanth, Physical One-Way Functions, PhD Thesis, Massachusetts Institute of Technology, Mar. 2001, 154 pgs.

Rührmair, Ulrich, Hilgers, Christian, Urban, Sebastian, Weiershäuser, Agnes, Dinter, Elias, Forster, Brigette, and Jirauschek, Christian, Revisiting Optical Physical Unclonable Functions, Cryptology ePrint Archive, Report 2013/215, Apr. 2013, https://eprint.iacr.org/eprint-bin/versions.pl?entry=2013/215, last accessed Mar. 21, 2021.

Rührmair, Ulrich, Hilgers, Christian, Urban, Sebastian, Weiershäuser, Agnes, Dinter, Elias, Forster, Brigette, and Jirauschek, Christian, Optical PUFs Reloaded, Cryptology ePrint Archive, Report 2013/215, May 2013, 13 pgs. at <https://eprint.iacr.org/eprint-bin/versions.pl?entry=2013/215, last accessed Mar. 20, 2021>.

Ruhrmair, Ulrich, and Holcomb, Daniel E., PUFs at a Glance, in proc. Design, Automation and Test in Europe, Mar. 2014, pp. 1-6.

Simmons, Gustavus J., A System for Verifying User Identity and Authorization at Point-of-Sale or Access, Cryptologica, 8(1), 1984, pp. 1-21.

Simmons, Gustavus, Identification of Data, Devices, Documents and Individuals, in proc. IEEE International Carnahan Conference on Security Technology, 1991, pp. 197-218.

Škorić, B., The Entropy of Keys Derived from Laser Speckle; Statistical Properties of Gabor-transformed Speckle, Journal of Optics A: Pure and Applied Optics, 10(5):055304-05516, Oct. 26, 2007, 25 pgs.

Škorić, B., Bel, T., Blom, A.H.M., De Jong, B.R., Kretschman, H., and Nellissen, A.J.M., Randomized Resonators as Uniquely Identifiable Anti-counterfeiting Tags, in proc. Secure Component System Identification Workshop, Berlin, Mar. 2008, 12 pgs.

Škorić, B., Quantum Readout of Physical Unclonable Functions: Remote Authentication Without Trusted Readers and Authenticated Quantum Key Exchange Without Initial Shared Secrets, Cryptology ePrint Archive, Report 2009/369, Jul. 2009, 21 pgs. at <https://eprint.iarc.org/2009/369, (last accessed Mar. 21, 2021)>.

Sultana, N., Zhou, Wei, Lafave, Jr., Tim P. and Macfarlane, Duncan L., HBr Based ICP Etching of High Aspect Nanoscale Trenches in InP: Considerations for Photonic Applications, Journal of Vacuum Science Technology, B 27(6) Nov./Dec. 2009, pp. 2351-2356.

Thornton, Mitchell A., Introduction to Quantum Computation Reliability, in proc. IEEE International Test Conference, Nov. 2020, pp. 1-10.

Thornton, Mitchell A. and Macfarlane, Duncan L., Quantum Photonic TRNG with Dual Extractor, in proc. Workshop on Quantum Technology and Optimization Problems, Mar. 2019, 12 pgs.

Tuyls, P., Škorić, B., Stallinga, S., Akkermans, A.H.M., and Ophey, W., Information-Theoretic Security Analysis of Physical Unclonable Functions, A.S. Patrick and M. Yung (Eds.): FC 2005, LNCS 3570, pp. 141-155, 2005.

Pappu, R., Recht, B., Taylor, J., and Gershenfeld, N., Physical One-Way Functions, Science, vol. 297, 2002.

Plaga, R. and Merli, D., A New Definition and Classification of Physical Unclonable Functions, in proc. Second Workshop on Cryptography and Security in Computing Systems, Jan. 2015, pp. 7-12.

Yang, J. and Chen, L., A New Loadless 4-Transistor SRAM Cell with a 0.18 μm CMOS Technology, in proc. Canadian Conference on Electrical and Computer Engineering, 2007, pp. 538-541.

Shichman, H. and Hodges, D., Modeling and Simulation of Insulated-Gate Field Effect Transistor Switching Circuits, IEEE Journal of Solid-State Circuits, SC-3, Sep. 1968, pp. 285-289.

Zhou, W., Sultana, N., and Macfarlane, D.L., HBr-Based Inductively Coupled Plasma Etching of High Aspect Ratio Nanoscale Trenches in GaInAsP/InP, Journal of Vacuum Science Technology, B 26(6), Nov./Dec. 2008, pp. 1896-1902.

Sharma, M. and Arora, N., Optima: A Nonlinear Model Extraction Program with Statistical Confidence Region Algorithms, IEEE Transactions on CAD, 12(7), Aug. 1993, pp. 982-987.

International Search Report and Written Opinion for International Patent Application No. PCT/US22/26304, dated Aug. 2, 2022, 7 pgs.

Office Action issued by the U.S. Patent and Trademark Office for U.S. Appl. No. 17/729,416, mailed Oct. 26, 2023, 16 pages.

International Preliminary Report on Patentability issued by the International Bureau of WIPO for International Patent Application No. PCT/US22/26304, mailed Nov. 9, 2023, 6 pages.

International Search Report and Written Opinion issued by the U.S. Patent Office as the International Searching Authority (USPTO/ISA) for International Patent Application No. PCT/US23/29359, mailed Nov. 8, 2023, 7 pages.

Extended European Search Report issued by the European Patent Office (EPO) for European Patent Application No. 22796537.3, mailed Feb. 6, 2025, 11 pages.

Jacinto et al., "Utilizing a Fully Optical and Reconfigurable PUF as a Quantum Authentication Mechanism", arxiv.org, Cornell University Library, 201 OLIN Library Cornell University Ithaca, Dec. 18, 2020, XP081841301.

Yao et al., "Quantum Cloning Attacks Against PUF-Based Quantum Authentication Systems", arxiv.org, Cornell University Library, 201 OLIN Library Cornell University Ithaca, May 3, 2016, XP080699045.

International Preliminary Report on Patentability issued by the International Bureau of WIPO for International Patent Application No. PCT/US2023/029359, mailed Feb. 20, 2025, 6 pages.

Office Action issued by the U.S. Patent and Trademark Office for U.S. Appl. No. 17/729,416, mailed Apr. 9, 2024, 15 pages.

(56) References Cited

OTHER PUBLICATIONS

Notice of Allowance issued by the U.S. Patent and Trademark Office (USPTO) for U.S. Appl. No. 17/729,416, mailed Aug. 7, 2024, 10 pages.

* cited by examiner

SYSTEMS AND METHODS FOR IMPLEMENTING STRUCTURES FOR PHYSICAL UNCLONABLE FUNCTIONS

RELATED APPLICATIONS

This application claims a benefit of priority under 35 U.S.C. § 119 to U.S. Provisional Patent Application No. 63/395,736 filed Aug. 5, 2022, entitled "Systems and Methods For Implementing A Photonic PUF Structure", by Duncan MacFarlane et al., which is hereby fully incorporated by reference in its entirety.

TECHNICAL FIELD

This disclosure relates generally to security of computing devices. In particular, this disclosure is related to the authentication of electronic devices and systems. More specifically, this disclosure relates to Physical Unclonable Functions (PUFs). Even more specifically, this disclosure relates to structures adapted for use in PUFs.

BACKGROUND

A Physical Unclonable Function (PUF) is a structure that can serve as a unique, unforgeable identifier (ID) for purposes of verifying the authenticity of a device or object. A PUF may thus, for example, perform a similar function as a serial number for a given device, but with the added requirement that the value of a PUF can never be copied, even if its value is provably correct. For a PUF, then, this unique identification thus has two main characteristics: 1) it is nearly impossible to duplicate, due to the details of its construction and 2) it is able to be queried in a way that can reliably and safely establish the identity of the object that possesses the ID.

The recent massive proliferation of connected devices (the "Internet of Things" or "IoT") has put an increasing emphasis on the ability to robustly distinguish between many otherwise identical units. Concurrently, this proliferation of devices has also created significant downward pressure on their production cost and deployment overhead. These overhead factors include not only raw distribution costs, but also the supplemental circuitry required to implement them, the operational cycle time required to reliably establish a secure unique ID, and finally, the overall production time—which includes any per-device provisioning steps required as well as the raw device manufacture. These time and cost pressures increase the already-difficult job of providing for robust security. Additionally, because these devices are all interconnected, there is the additional proviso that the device(s) to be uniquely and securely identified may not necessarily be available for direct physical inspection. These requirements are nearly all mutually antagonistic, but it is highly desirable to address all of them simultaneously.

Accordingly, there is a need for systems and methods for improved PUFs.

SUMMARY

Some additional context with respect to PUFs and their utilization may be useful. A PUF may be used to securely, and uniquely, identify electronic devices through generation of a (PUF) signature. Accordingly, perhaps the most important attribute of a PUF (e.g., the root of the host device's signature) is its uniqueness. At the same time, such a unique ID should be protected from discovery by an adversary (typically by use of a secure verification protocol). A basic procedure of verifying a PUF value (and thus, verifying the unique identity of the device that hosts that PUF) is thus embedded into an interactive, transactional mechanism usually referred to as a "challenge-response" protocol (CRP).

In many cases it is desirable that a truly secure PUF system has certain characteristics. These characteristics include; that the devices in question exhibit a nearly-uniform PUF value probability distribution function (PDF) among the community of all such devices; that challenges (for the CRP) employ unpredictable nonce values or other means to prevent repeatability in the responses; that a mapping from the challenge domain to the corresponding response co-domain be accomplished by a sufficiently strong one-way function; that there exists an unambiguous method of verifying the authenticity of a respondent, and that the PUF value (i.e., the root value from which a signature may be derived) must be safe from discovery, even under direct physical inspection (e.g., including complete disassembly).

The ability to implement a PUF that meets such criteria may, however, be quite difficult. One particular impediment to implementing such PUF is the variation between the type of circuitry used to implement computing devices and additionally, how such circuits are operated. For instance, computing devices may include electronic circuits or photonic (also referred to as optical) circuits (or some combination of electronic and optical circuits). Electronic PUF circuitry can be susceptible to side-channel or eavesdropping attacks due to radiated electromagnetic energy during PUF circuit operations. This can allow an adversary to accumulate a set of partial knowledge of the PUF value itself, that can be mapped to a table of challenge/response pairs. In particular, timing based PUFs are susceptible to "modeling attacks" wherein digital clones are constructed based on tables of challenge/response pairs acquired during an eavesdropping attack. Informatic-theoretic approaches can be applied to characterize the strength of state-based PUFs allowing exploitable information to be acquired by an adversary to facilitate the characterization of a particular instance of an internal PUF function. More recently, PUF attacks based upon Machine Learning (ML) approaches such as "Generative Adversarial Networks" (GAN) have emerged and are of concern. An important vulnerability that can be exploited to defeat PUF-based security is the ability to characterize the supporting circuitry through eavesdropping or through invasive physical attacks.

Another consideration for the implementation of a PUF is that, increasingly, circuits that include or make use of such PUFs may be operated in the classical domain (e.g., according to the principles of classical operation, also referred to as classical mode) or in a quantum domain (e.g., according to the principles of quantum mechanical operation, also referred to as quantum mode). The response of a device operating in the quantum domain is often markedly different than a device that operates in the classical domain. These differences can be exploited if the same device can be operated in both domains. Both photonic and electronic circuits can exhibit this dual-domain behavior, but electronic devices are much more difficult to shield from the environment than photonic devices. As such, electronic PUFs are more susceptible to active external influence; i.e., Electromagnetic Interference (or EMI); attacks. They are also more difficult to shield from passive external (eavesdropping) attacks than photonic devices. Thus, it would be extremely desirable to develop a PUF system that could potentially be used within circuits that are either wholly or in part comprised of photonic circuitry, where that same PUF system may be operated in either the classical domain or the quantum domain.

Additionally, if the portion of the device that is used to generate the PUF signature is functionally independent from the portion of the circuit that is used for other purposes, then that device is more easily attacked by physical disassembly or other invasive attacks. Thus, it is also desirable to develop a PUF that uses substantially the same circuitry to implement the PUF functionality and "normal" operation, in either the classical or the quantum domains. If that "normal" operation mode also provides a method for generating an embedded PUF signature, then such a device can be used to produce "authenticated" results. In other words, the results of the normal operation of the device can be verified to have been produced by a specific device.

These various considerations, among others, may be addressed by embodiments as disclosed herein which utilize a photonic circuit or a photonic (integrated) circuit (PC or PIC) in an implementation of a PUF system, including a hybrid PUF system. The term "hybrid" is used herein to indicate that the same PUF system can be operated in either the quantum domain or the classical domain (or some mixture of both). To describe in more detail, circuits identical in design (whether electronic or optical) that comprises a chain (e.g., one or more) of components (e.g., hardware or physical implementation of a function which include, for example photonic or electrical circuits) may exhibit variations. These variations may be introduced intentionally or unintentionally (or both); intentionally, through a design of the component (e.g., a design that introduces variation to the component while keeping the intended functionality the same) or unintentionally, as, for example, variations introduced through the manufacturing process or by related tolerances of the component circuitry. One of these variations between photonic circuits (e.g., of identical design) may be related to a state of polarization (SOP) of an optical signal (e.g., one or more photons) that propagate through that photonic circuit. Since the polarization state of an optical signal may be measured independently of other characteristics of that same signal (e.g., frequency, phase or amplitude), then we can use the polarization of a stream of photons as an orthogonal (to these other characteristics) basis upon which we can prepare and measure the identity of a photonic circuit. This polarization-related behavior can thus be independently measured (e.g. in the classical domain) while the other attributes can be operated and measured in the quantum domain—at the same time.

To elaborate on these differences in more detail, it will be understood that as the frequency of an electromagnetic wave increases, the wave enters the region of the spectrum typically considered as light or an optical wave. This increase in frequency causes the optical wave to increase its sensitivity to phase disruptions. Because the geometric dimensions of PC components are on the order of a wavelength, these phase disruptions translate into SOP sensitivities that are desirable for a PC based PUF. An example of this sensitivity to phase is manifested as a change in the optical wave SOP as it propagates through such a waveguide that is manufactured with local imperfections in the boundary conditions that define the waveguide mode. In such optical components and systems, including fiber optic communication systems, this sensitivity to impairments can be characterized as "polarization mode dispersion" (PMD) and "polarization dependent loss" (PDL). This shift in SOP through an optical circuit may be utilized to realize a PUF system. In particular, optical path specific impairments caused by stresses and strains, and component fabrication variability cause an output SOP to vary in response to an associated input SOP in a random but consistent manner. Multiple successively launched input wave SOPs result in corresponding multiple output SOPs with a highly repeatable SOP-to-SOP variation among a collection of undisturbed and manufactured photonic circuits of the same design.

As can be seen then, each instance of a photonic circuit of the same design may change the SOP of an optical signal in a different manner based on the variation of birefringence of the components comprising each instance of the photonic circuit. This variation may be due to, for example, perturbations in the geometry between (the components of) instances of those photonic circuits or other causes. Accordingly, each PC of a same design may exhibit a relatively large degree of difference in the effect that PC has on the SOP of an optical signal.

As such, SOP may serve as an effective basis for a photonic circuit based PUF circuit. Namely, according to one embodiment, a PUF system may include a photon source coupled to a photonic circuit comprising one or more photonic components, where that photonic circuit has at least two outputs. A polarization controller is positioned between the photon source and the PC. This polarization controller is adapted to affect the polarization of the optical signal on the input waveguide. Accordingly, the polarization input (e.g., the polarization input signal) to the polarization controller is representative of the input polarization of the optical signal input to the photonic circuit.

For example, in certain embodiments this polarization controller may include a chain of one or more components that are responsive to the input signal such as one or more heaters that are responsive to an input voltage or current. These heaters may exert stress or strain directly or indirectly (e.g., through a surrounding substrate) on the input waveguide in a repeatable manner such that the polarization of the optical signal input to the photic circuit of the PUF system corresponds to the input voltage (i.e., the same input voltage will produce a substantially identical SOP of the optical signal input to the photonic circuit). As another example, a polarization controller may include one or more polarization paddles that may be configured in different orientations (e.g., vertically or horizontally).

As mentioned, the photonic circuit of the PUF system may comprise at least two outputs. The signals on these outputs may be the basis for a PUF signature generated by the PUF system. Specifically, the photonic circuit may comprise one or more polarizing beam splitters to generate the at least two outputs of the photonic circuit.

The use of one or more polarizing beam splitters within the photonic circuit of the PUF system yields output power components on the two outputs of photonic circuit whose ratio (e.g., with the input signal to the polarization signal held at a particular level) to provide the PUF signature for the PUF system. Accordingly, during operation of embodiment of the PUF system the input signal to the polarization controller may be controlled (e.g., held at a particular level) and one or more photons provided from the photon source to the photonic circuit through the input waveguide. A ratio based on the signals on the outputs of the photonic circuit of the PUF system may thus comprise the PUF signature of the PUF system.

The PUF system may thus comprise a detector on each of the outputs of the photonic circuits, wherein the detector is adapted to detect the presence of a photon on the output or a strength of the optical signal on that output. When operating the PUF system in the classical domain, the polarization input signal to the polarization controller may be controlled (e.g., held at a particular level) and one or more input photons provided from the photon source to the photonic circuit through the input waveguide. The ratio of the strength of the signal detected by the first detector on a first output of the photonic circuit to the strength of the signal detected by the second detector on a second output of the photonic circuit may thus serve as the PUF signature of the PUF system.

It may be observed that when such a PUF system is operated in the quantum domain, for each input photon provided from the photon source through the input waveguide to the photonic circuit, there may only be a photon output on one of the two (or more) outputs of the photonic circuit of the PUF system. As such, when operating the PUF system in the quantum domain, a plurality of photons may be provided from the photon source to the photonic circuit through the input waveguide (e.g., with the polarization input signal held at a particular level). A ratio to be used for the PUF signature can then be determined by using the first detector on the first output of the photonic circuit to accumulate a first number of photons appearing on the first output and using the second detector on the second output to accumulate a second number of photons appearing on the second output. The ratio of the first number of photons to the second number of photons (or vice-versa) may then be utilized as the PUF signature for the PUF system when operated in the quantum domain.

Embodiments may thus provide a number of advantages. Optical processing is advantageous for security applications such as these since they are less susceptible to eavesdropping and side channel monitoring via the difficulty of observing electromagnetic radiation emissions during operation of photonic circuits. Additionally, one large advantage the use of SOP and photonic circuits in a PUF system may be desirable from the perspective of tampering or resistance to destructive reverse engineering approaches to discerning a PUF signature. This resistance occurs because any attempt to tamper with a manufactured photonic circuit, such as engaging in a scraping attack, would also necessarily change the very small stresses and strains that were originally present in the manufactured PUF system components. Therefore, a photonic circuit based PUF system may provide an enhanced degree of security against scraping and similar reverse-engineering approaches that may be employed by an adversary.

In one specific embodiment, to enhance such security advantages, among other reasons, the PUF system may be included on an integrated circuit or "chip" where the photon source and the photonic circuit may be in different or disparate locations on the chip. For example, the photon source and photonic circuit may be arrayed in different layers of a chip or arrayed distally from one another relative to one or more axes of the chip. The input waveguide may thus be arranged so that it traverses a significant portion of the chip in which the PUF system is disposed. By configuring the input waveguide (and the polarization controller) in this manner the security of the PUF system is enhanced as almost any tampering with the chip in which the PUF system resides may result in a change to the stresses strains that were originally present in the manufactured PUF system components due to the increased area covered by the sinuous nature of the input waveguide.

In certain cases, it may be desired to reprovision a PUF system in various circumstances such that the PUF system is altered to generate a different PUF signature (e.g., based on the same set of inputs or challenges). Accordingly, embodiments of a PUF system as disclosed may include one or more reprovisioning mechanisms. Such a reprovisioning mechanism may serve to affect the birefringence of the photonic circuit of the PUF system to alter the photonic circuit's effect on the SOP of propagated optical signals (e.g., one or more photons).

These reprovisioning mechanisms may be either volatile or non-volatile. A non-volatile reprovisioning mechanism may have a permanent (or semi-permanent) effect on the birefringence of the photonic circuit of the PUF system. For example, one or more reconfigurable elements may be disposed within the photonic circuit (or elsewhere within the PUF system), where those reconfigurable elements may be physically altered based on a stimulus. Such reconfigurable elements may include, for instance, a simple fusible link that can be blown that will affect the waveguide or other components of the photonic circuit to change the birefringence of the photonic circuit. As another example, a non-volatile reconfigurable element may include polysilicon areas or "tubs" through which the waveguide of the photonic circuit passes or adjacent to a waveguide in the photonic circuit. When such polysilicon areas are placed under heat and the heat subsequently removed, this polysilicon may refreeze with a physically different configuration. Thus, the stress and strains on the waveguide of the photonic circuit are altered and, commensurately, the birefringence of the photonic circuit of the PUF system is likewise altered.

Similarly, volatile reconfigurable elements may affect the birefringence of the photonic circuit of the PUF system in a transitory manner that, in some cases, may be controlled to affect the birefringence of the photonic circuit differently. For example, these volatile reconfigurable elements may include one or more heaters along one or more portions of a waveguide internal to the photonic circuit that may be controlled to affect the birefringence of the photonic circuit. As another example of a volatile reconfigurable element, one or more variable phase shifters may be coupled in the waveguide internal to the photonic circuit and those variable phase shifters controlled to affect the birefringence of the photonic circuit and thus (e.g., temporarily) change the polarization transfer function of the photonic circuit used to generate the PUF signature.

Specifically, with respect to the use of variable phase shifters as a volatile reconfigurable element, as discussed in one embodiment a photonic circuit may include one or more Hadamard gates comprising a beam splitter. Because two Hadamard gates may form a Mach-Zehnder Interferometer (MZI), a variable phase shift gate may be coupled between two Hadamard gates of the photonic circuit of the PUF system. This variable phase shift can act as a variable "steering" gate that can be controlled to affect the path by which a photon (or stream of photons) will transit through the photonic circuit. Since different optical paths will exhibit different polarization effects, then the birefringence of the photonic circuit and thus the PUF signature generated by the PUF system can be affected by this MZI-based steering. It should be noted that this MZI "steering" effect operates on individual photons (and thus, at the quantum level) as opposed to only affecting groups of photons (i.e., in the classical domain).

In one embodiment, a PUF system may comprise a photon source and a photonic circuit coupled to the photon source via an input waveguide. The photonic circuit may have a first output and a second output. The PUF system may also include polarization controller responsive to a polarization input, wherein the operation of the polarization controller in response to the polarization input is adapted to affect the polarization of photons on the input waveguide; a first detector coupled to the first output and adapted to detect a first signal on the first output; and a second detector coupled to the second output and adapted to detect a second signal on the second output. The PUF system may be adapted to determine a PUF signature based on the first signal and the second signal.

Thus, embodiments may determine the PUF signature at two distinct times. For example the PUF system may be adapted to: determine the PUF signature at a first time by providing a first polarization input to the polarization controller at the first time, detecting the first signal at the first time, detecting the second signal at the first time and determining the PUF signature based on the first signal at the first time and the second signal at the first time, and determine the PUF signature at a second time by providing the first polarization input to the polarization controller at the second time, detecting the first signal at the second time, detecting the second signal at the second time and determining the PUF signature based on the first signal at the second time and the second signal at the second time.

In certain embodiments, the first signal is a presence of a photon on the first output and the second signal is the presence of the photon on the second output and determining the PUF signature comprises accumulating a first number of photons at the first output based on the first signal and accumulating a second number of photons at the first output based on the first signal and determining a ratio between the first number of photons and the second number of photons. In other embodiments, the first signal is a first strength of an optical signal at the first output and the second signal is a second strength of an optical signal at the second output and determining the PUF signature comprises determining a ratio between the first strength and the second strength.

In some embodiments, a method for determining a PUF signature may comprise: providing one or more photons from a photon source to a photonic circuit coupled to the photon source via an input waveguide, the photonic circuit having a first output and a second output; controlling a polarization controller using a polarization input to affect the polarization of photons on the input waveguide; detecting a first signal on the first output of the photonic circuit; detecting a second signal on the second output of the photonic circuit; and determining a PUF signature based on the first signal and the second signal. Controlling the polarization controller may comprise holding the polarization input at a same level.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
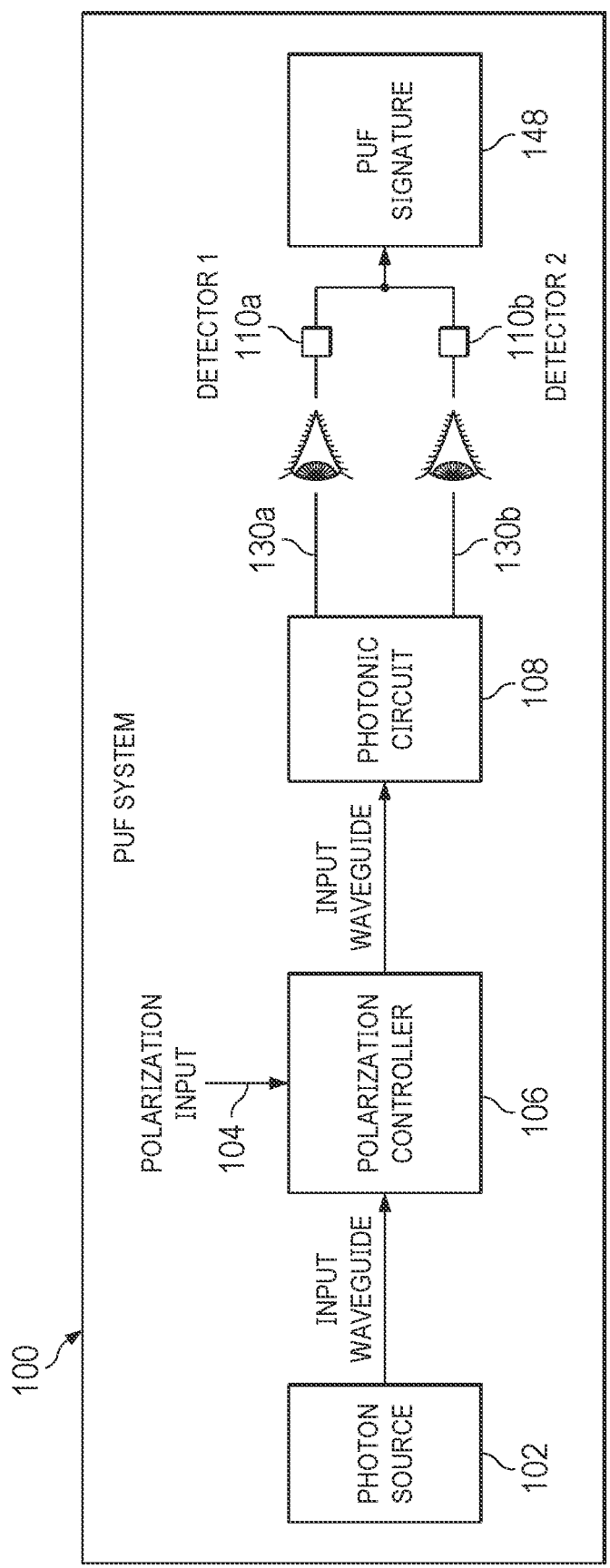
FIG. 1 is a block diagram of one embodiment of a PUF system.

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. The descriptions included in U.S. application Ser. No. 17/729,416 entitled Systems and Methods for Hybrid Physical Unclonable Functions by Thornton et al, filed on Apr. 26, 2022 and hereby incorporated herein by reference may also be useful to an understanding of embodiments. As may be recalled from the above discussion, it is increasingly desirable to be able to securely, and uniquely, identify electronic devices. A PUF is one way to address such desires. Accordingly, perhaps the most important attribute of a PUF is its uniqueness. In other words, how many distinct items with the same basic structure (e.g., circuitry) can be reliably distinguished from each other. Establishing a unique identity where one object is functionally identical to many others, but can nevertheless be distinguished from these other devices is a difficult task. At the same time, such a unique ID should be protected from discovery by an adversary. This last task has been made much harder of late due to the proliferation of Machine Learning (ML)-based adversaries, who are able to harness the power of statistics over very large data sets to unearth patterns that are not readily discernible to humans. For this reason, the basic procedure of verifying a PUF value (and thus, verifying the unique identity of the device that hosts that PUF) must, by necessity in many instances, be embedded into an interactive, transactional mechanism.

This transactional process is accomplished by two-way communications in a "Challenge-Response-Protocol" (CRP). The challenger (who wishes to verify the identity of the device in question) issues a query to the respondent (device), which then replies with a response message that can be uniquely verified to "prove" its identity in some way. Usually, this CRP protocol begins with a message that contains a random number (called a "nonce"). This nonce is necessary in order to prevent replay attacks. If the nonce is not entirely random (i.e., if it is predictable, even to a small extent), then an attacker can pre-compute collections of potential response messages ahead of time. This ability to create a collection of potential responses reduces the search space of an attacker, which can result in a statistically significant amount of information regarding what the PUF value might be to be gleaned from any observed message traffic to and from the device in question. After some number of legitimate challenge-response message pairs, an ML-based adversary may be able to successfully impersonate the legitimate device to some other challenger. In some cases, it has been shown that as few as a dozen authentic CRP transactions are enough to allow an ML-based adversary to successfully impersonate an authentic device.

The ability to discern statistically relevant information from an authentic device's CRP messages (e.g., to break the security conferred by a PUF or CRP using a PUF) depends not only on the nature of the nonces used in the challenge messages, but also on the statistical distribution of the authentic devices' PUF values themselves (upon which the devices' response messages are based). If the PUF signatures (values) have a statistical distribution that exhibits "clustering", then the same statistical inferences can be made as previously mentioned. In other words, if the PUF signature probability distribution function (PDF) is not roughly uniform over the whole potential set of PUF signatures produced by the PUF or a response using the PUF, then its probable value may be predicted, given enough legitimate message data.

Another aspect of a PUF-based CRP that is critical, from a security perspective, is the nature of the function that is used to map from the PUF challenge domain to the response co-domain (or image). This function mapping should be essentially non-reversible. If it is not so, then an attacker can simply observe a single legitimate CRP exchange and use that information to determine the PUF signature by reversing the mapping function from the image back to the PUF value domain. This kind of function is typically referred to as a "one-way function". Another use of such a one-way function could be for the purposes of output "whitening". If the PUF's PDF is not bunched, but is nonetheless not uniform (e.g. a binomially distributed PDF), then the final output can be made roughly uniform by using a one-way function, such as a simple hash function.

One final aspect of a viable PUF technology is that of non-discoverability, even under the face of direct physical inspection. In other words, if an adversary is able to disassemble a device containing a PUF, then that adversary should not be able to determine the PUF's innate value even if it is able to take the device apart (down to the lowest level).

While a PUF may be defined in terms of a collection of systems or devices, $\{d_1, d_2, d_3, \ldots, d_k\}$, for the purposes of this application, a more general definition of a PUF may also be adopted. A PUF can thus be thought of as a physical (e.g., information-storage) system that is protected by a security mechanism with the objective of rendering the system very difficult to duplicate or reverse engineer and that is meant to remain effective against an active attacker that may have temporary or permanent physical access to the module hosting the security mechanism in its original form.

Because PUFs are physically implemented, typically as circuitry rather than a programmed and user-defined function, in the ideal case they are instances of one-way functions implemented via the exploitation of physical properties. This class of one-way functions is based upon some property or state of a physical system with the important concept that the resulting signatures are repeatable and unique for a given device. An analogous idea is the unique patterns one finds in individual snowflakes. While all snowflakes are formed through a common set of circumstances in the atmosphere resulting in the condition of producing snowfall, close scrutiny of each snowflake reveals that they appear to be made of different patterns of ice crystals. Furthermore, the probability that any two snowflakes have exactly the same structure is very small. Thus, a snowflake's structure could be used as a representation of its signature. The snowflake's signature is repeatable since each subsequent examination of the same snowflake results in observing the same pattern (assuming it has not melted). Two or more snowflakes can be differentiated from one another based upon their unique signatures. That is, probabilities of signature collisions among any two snowflakes are very small. Unique will thus be taken to mean for purposes of this disclosure that the probability of finding another (e.g. the same signature produced by another device) is very small, not that it is the only one.

As can be seen then, it is desirable that a secure PUF system exhibits the following five requisite attributes:
1) The set of devices in question must exhibit a nearly-uniform PUF value PDF,
2) All challenges must employ completely unpredictable nonce values,
3) The mapping from the challenge domain to the corresponding response co-domain must be accomplished by a sufficiently strong one-way function,
4) There must exist an unambiguous method of verifying the authenticity of a respondent, and
5) The PUF value must be safe from discovery, even under direct physical inspection (including complete disassembly).

Finally, to aid in the viability of entities to implement such a successful PUF technology, it may also be desirable that (in addition to the five features listed above), a PUF device be low cost, low overhead, have repeatability/stability, and be robust.

The ability to implement a PUF that meets such criteria may, however, be quite difficult. One particular impediment to implementing such PUF is the variation between the type of circuitry used to implement computing devices and additionally, how such circuits are operated. For instance, computing devices may include electronic circuits or photonic (also referred to as optical) circuits (or some combination of electronic and optical circuits). Electronic PUF circuitry can be susceptible to eavesdropping attacks due to radiated electromagnetic energy during PUF circuit operations that can allow an adversary to accumulate a partial table of challenge/response pairs. In particular, timing based PUFs are susceptible to "modeling attacks" wherein digital clones are constructed based on tables of challenge/response pairs acquired during an eavesdropping attack. Information-theoretic approaches can be applied to characterize the strength of state-based PUFs allowing exploitable information to be acquired by an adversary to facilitate the characterization of a particular instance of an internal PUF function. More recently, PUF attacks based upon Machine Learning (ML) approaches such as "Generative Adversarial Networks" (GAN) have emerged and are of concern. An important vulnerability that can be exploited to defeat PUF-based security is the ability to characterize the supporting circuitry through eavesdropping or through invasive physical attacks.

Another consideration for the implementation of a PUF is that, increasingly, circuits that include or make use of such PUFs may be operated in the classical domain (e.g., according to the principles of classical operation, also referred to as classical mode) or in a quantum domain (e.g., according to the principles of quantum mechanical operation, also referred to as quantum mode). Thus, it would be extremely desirable to use a PUF system that could potentially be used within circuits that are either wholly or in part comprised of photonic circuitry, where that same PUF system may be operated in either the classical domain or the quantum domain, and moreover, may comprise substantially the same circuitry, and operate with substantially similar characteristics, when operating in the classical domain or the quantum domain.

These various considerations, among others, may be addressed by embodiments as disclosed herein which utilize a photonic circuit or a photonic (integrated) circuit (PC or PIC) in an implementation of a PUF system, including a hybrid PUF system. The term "hybrid" is used herein to indicate that the same PUF system can be operated in either the quantum domain or the classical domain (or some mixture of both). To describe in more detail, circuits identical in design (whether electronic or optical) that comprises a chain (e.g., one or more) of components (e.g., hardware or physical implementation of a function which include, for example photonic or electrical circuits) may exhibit variations. These variations may be introduced intentionally or unintentionally (or both); intentionally, through a design of the component (e.g., a design that introduces variation to the component while keeping the intended functionality the same) or unintentionally, as, for example, variations introduced through the manufacturing process or by related tolerances of the component circuitry. One of these variations between photonic circuits (e.g., of identical design) may be related to a state of polarization (SOP) of an optical signal (e.g., one or more photons) that propagate through that photonic circuit.

To elaborate on these differences in more detail, it will be understood that as the frequency of an electromagnetic wave increases, the wavelength decreases and this smaller wavelength causes the electromagnetic wave to be increasingly sensitive to phase disruptions caused by microscopic variations in the photonic circuit. When the geometric dimensions of PC components are on the order of a single wavelength, these phase disruptions translate into SOP sensitivities that are desirable for a PC based PUF. An example of this sensitivity to phase is manifested as a change in the optical wave SOP as it propagates through such a waveguide that is manufactured with local imperfections in the boundary conditions that define the waveguide mode. In such optical components and systems, including fiber optic communication systems, this sensitivity to impairments can be characterized as "polarization mode dispersion" (PMD) and "polarization dependent loss" (PDL). This shift in SOP through an optical circuit may be utilized to realize a PUF system. In particular, optical path specific impairments caused by stresses and strains, and component fabrication variability cause an output SOP to vary in response to an associated input SOP in a random but consistent manner. Multiple successively launched input wave SOPs result in corresponding multiple output SOPs with a highly repeatable SOP-to-SOP variation among a collection of undisturbed and manufactured photonic circuits of the same design.

As can be seen then, each instance of a photonic circuit of the same design may change the SOP of an optical signal in a different manner based on the variation of birefringence of the components comprising each instance of the photonic circuit. This variation may be due to, for example, perturbations in the geometry between (the components of) instances of those photonic circuits or other causes. Accordingly, each PC of a same design may exhibit a relatively large degree of difference in the effect that PC has on the SOP of an optical signal. As such, SOP may serve as an effective basis for a photonic circuit based PUF circuit.

Turning first to FIG. 1 then, one embodiment of PUF system 100 includes photonic circuit 108 coupled to photon source 102. Photonic circuit 108 comprises one or more photonic components and has at least two outputs 130. A polarization controller 106 is situated between the photon source 102 and the photonic circuit 108. For example, the polarization controller 106 may reside on, or adjacent to, an input waveguide adapted to conduct an optical signal (e.g., one or more photons) from the photon source 102 to the photonic circuit 108. This polarization controller 106 is adapted to affect the polarization of the optical signal on this input waveguide. Thus, polarization controller 106 is responsive to polarization input 104, wherein the operation of the polarization controller 106 in response to the polarization input 104 is adapted to affect the polarization of photons on the input waveguide. Specifically, the polarization controller 106 is adapted to affect the polarization of the optical signal from the photon source 102 on the input waveguide in a repeatable manner based on a polarization input 104, where the effect of the polarization controller 106 on the optical signal may vary based on the variance of the polarization input 104. Accordingly, the polarization input 104 (the polarization input signal) to the polarization controller 106 is representative of the input polarization of the optical signal input to the photonic circuit 108. Expressed another way, the input polarization of the optical signal is programmable based on the polarization input signal 104 to the polarization controller 106. Thus, by holding polarization input signal 104 at a particular level, a similar or identical SOP of the photons of the optical signal input to the photonic circuit 108 can be obtained.

Figure 2:
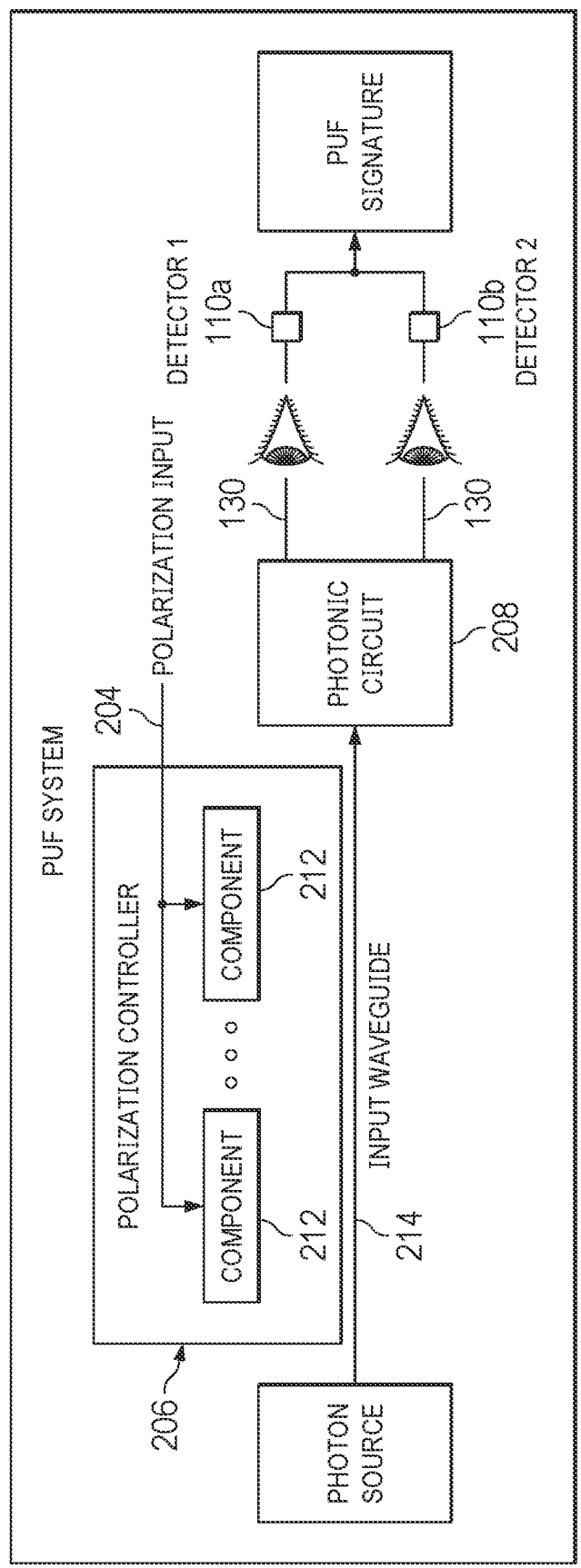
FIG. 2 is a block diagram of one embodiment of a PUF system.

Looking briefly at FIG. 2, in certain embodiments a polarization controller 206 may include a chain of one or more components 212 that are responsive to the polarization input signal 204 such as one or more heaters that are responsive to an input signal 204 comprising an input voltage or current (collectively referred to as voltage herein without loss of generality). These components 212 (e.g., heaters) may exert stress or strain directly or indirectly (e.g., through a surrounding substrate) on the input waveguide 214 in a repeatable manner such that the polarization of the optical signal input to the photic circuit 208 of the PUF system corresponds to the input signal 204 (e.g., the same input voltage on input signal 204 will produce a substantially identical SOP of the optical signal input to the photonic circuit 208. As another example, the components 212 of polarization controller 206 may include one or more polarization paddles that may be configured in different orientations (e.g., vertically or horizontally).

Returning to FIG. 1, as mentioned, the photonic circuit 108 of the PUF system 100 may comprise at least two outputs 130a, 130b. The signals on these outputs 130 may be the basis for PUF signature 148 generated by the PUF system 100. Specifically, the photonic circuit 108 may comprise one or more polarizing beam splitters to generate the at least two outputs 130 of the photonic circuit 108. For example, in one instance the photonic circuit 108 may comprise a chain of one or more Hadamard gates (e.g., three Hadamard gates) where those Hadamard gates are implemented as such a polarizing beam splitter.

The use of one or more polarizing beam splitters within the photonic circuit 108 of the PUF system 100 yields output power components on the two outputs 130 of photonic circuit 108 whose ratio (e.g., with the input signal to the polarization signal held at a particular level) may provide a basis for the PUF signature 148 for the PUF system 100. Accordingly, during operation of an embodiment of the PUF system 100 the polarization input signal 104 to the polarization controller 106 may be controlled (e.g., held at a particular level) and one or more photons provided from the photon source 102 to the photonic circuit 108 through the input waveguide. The ratio of the signals on outputs 130 of the photonic circuit 108 of the PUF system 100 may thus comprise the PUF signature 148 of the PUF system 100. In particular, the unique polarization transfer function of the photonic circuit 108 is a ratio of powers that can be measured and is strongly dependent on a particular circuit instance. Moreover, the measured PUF response signals are highly repeatable since the same birefringent perturbations are encountered by the input optical signal (e.g., when the polarization input 104 is held at the same level).

The PUF system 100 may thus comprise a detector 110a, 110b on each of the outputs 130a, 130b of the photonic circuit 108, wherein each detector 110a, 110b is adapted to detect the presence of a photon on the output 130a, 130b, or a strength of the optical signal on its respective output 130a, 130b. When operating the PUF system 100 in the classical domain, the polarization input signal 104 to the polarization controller 106 may be controlled (e.g., held at a particular level) and one or more input photons provided from the photon source 102 to the photonic circuit 108 through the input waveguide. The ratio of the strength of the signal detected by the first detector 110a on a first output 130a of the photonic circuit 108 to the strength of the signal detected by the second detector 110b on a second output 130b of the photonic circuit 108 may thus serve as the PUF signature 148 of the PUF system. It will thus be realized that the same PUF signature 148 may be generated at different times by controlling the polarization input signal 104 in the same manner (e.g., holding it at the same level) when determining PUF signature 148.

It may be observed that when such a PUF system is operated in the quantum domain, for each input photon provided from the photon source 102 through the input waveguide to the photonic circuit 108, there may only be a photon output on one of the two (or more) outputs 130 of the photonic circuit 108 of the PUF system 100. As such, when operating the PUF system 100 in the quantum domain, a plurality of photons may be provided from the photon source 102 to the photonic circuit 108 through the input waveguide (e.g., with the polarization input signal 104 held at a particular level). A ratio to be used for the PUF signature 148 can then be determined by using the first detector 110a on the first output 130a of the photonic circuit 108 to accumulate a first number of photons appearing on the first output 130a and using the second detector 110b on the second output 130b to accumulate a second number of photons appearing on the second output 130b. The ratio of the first number of photons to the second number of photons (or vice-versa) may then be utilized as the PUF signature 148 for the PUF system when operated in the quantum domain. It may be observed that, in certain instances, as the plurality of photons accumulated increases in number when operating during a quantum mode of operation, the ratio determined during the quantum mode of operation may be substantially similar to the ratio determined during the classical mode of operation of the PUF system 100 (e.g., with the polarization input held at the same level).

Embodiments may thus provide a number of advantages. Optical processing is advantageous for security applications such as these since they are less susceptible to eavesdropping and side channel monitoring via the difficulty of observing electromagnetic radiation emissions during operation of photonic circuits. Additionally, one large advantage the use of SOP and photonic circuits in a PUF system may be desirable from the perspective of tampering or resistance to destructive reverse engineering approaches to discerning a PUF signature. This resistance occurs because any attempt to tamper with a manufactured photonic circuit, such as engaging in a scraping attack, would also necessarily change the very small stresses and strains that were originally present in the manufactured PUF system components. Therefore, a photonic circuit based PUF system may provide an enhanced degree of security against scraping and similar reverse-engineering approaches that may be employed by an adversary.

In one specific embodiment, to enhance such security advantages, among other reasons, a PUF system may be included on an integrated circuit or "chip" where the photon source and the photonic circuit may be in different or disparate locations on the chip. For example, the photon source and photonic circuit may be arrayed in different layers of a chip or arrayed distally from one another relative to one or more axes of the chip. The input waveguide may thus be arranged so that it traverses a significant portion of the chip in which the PUF system is disposed. As but one example, the input waveguide between the photon source and the photonic circuit of the PUF system may be routed in a sinuous or serpentine manner (e.g., across or through the layers of a chip). The components of the polarization controller may likewise be arrayed along this sinuous input waveguide. For example, in cases where heaters are utilized as a polarization controller for the PUF system, one or more of such heaters may be arrayed along the input waveguide of the PUF system. By configuring the input waveguide (and the polarization controller) in this manner the security of the PUF system is enhanced as almost any tampering with the chip in which the PUF system resides may result in a change to the stresses strains that were originally present in the manufactured PUF system components due to the increased area covered by the sinuous nature of the input waveguide.

It will be noted that embodiments of a PUF system disclosed herein may utilize the fact that each photonic circuit has a unique polarization transfer function that is a ratio of powers that can be measured and are strongly dependent on a particular circuit instance. Accordingly, the measured PUF response signals for embodiments of a PUF system are highly repeatable since the same birefringent perturbations are encountered by the same optical input signal. It may, however, be desired to reprovision a PUF system in various circumstances such that the PUF system is altered to generate a different PUF signature (e.g., based on the same set of inputs or challenges).

Figure 3:
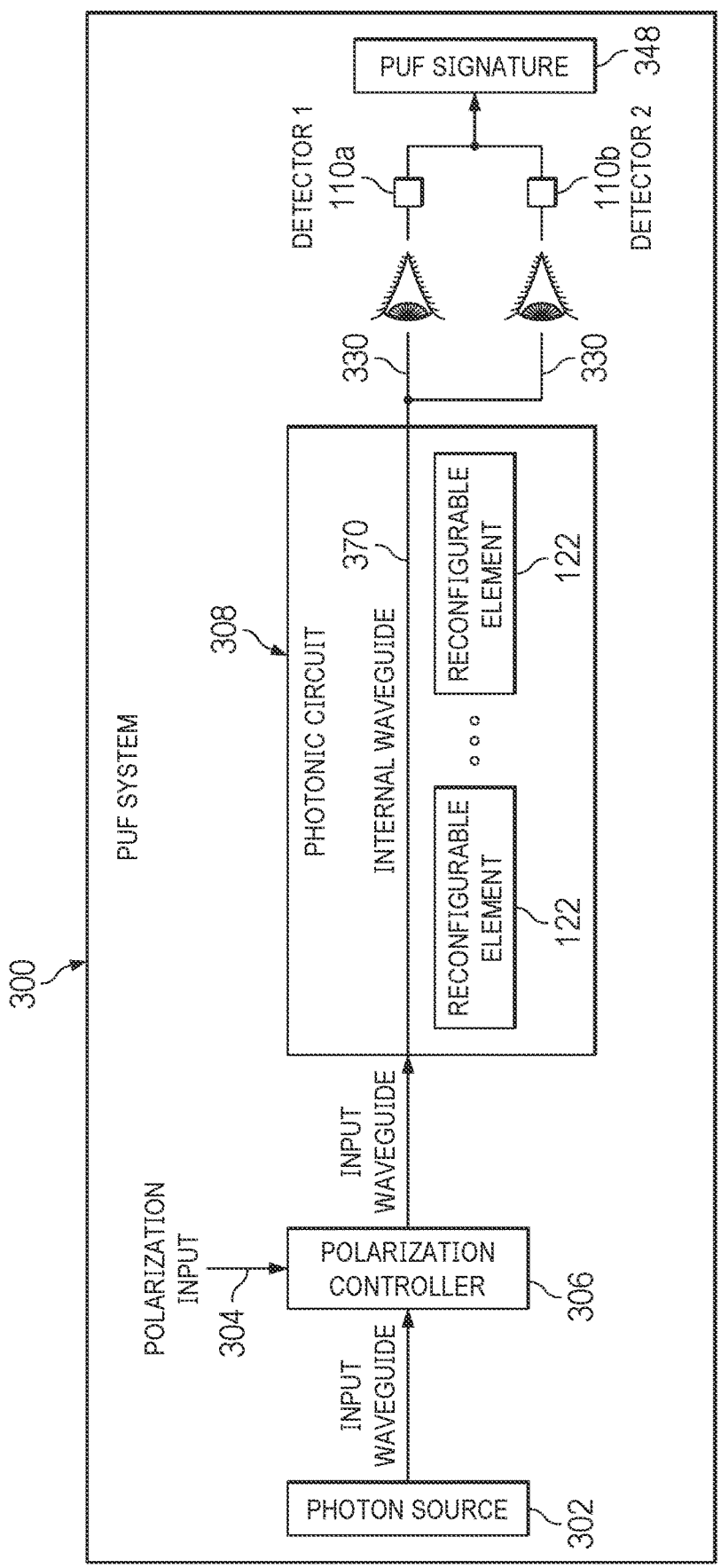
FIG. 3 is a block diagram of one embodiment of a PUF system.

Accordingly, embodiments of a PUF system as disclosed may include one or more reprovisioning mechanisms. FIG. 3 is a block diagram of one embodiment of such a PUF system 300. Such a reprovisioning mechanism may serve to affect the birefringence of the photonic circuit 308 of the PUF system 300 to alter the photonic circuit's effect on the SOP of propagated optical signals (e.g., one or more photons). More particularly, these reprovisioning mechanisms may affect the polarization transfer function of the photonic circuit of the PUF system such that the ratio generated on the outputs 330 of the photonic circuit 308 in response to a given optical input signal may be altered.

These reprovisioning mechanisms may be either volatile or non-volatile. A non-volatile reprovisioning mechanism may have a permanent (or semi-permanent) effect on the birefringence of the photonic circuit of the PUF system. For example, one or more reconfigurable elements 322 may be disposed within the photonic circuit 308 (or elsewhere within the PUF system), where those reconfigurable elements 322 may be physically altered based on a stimulus. Such reconfigurable elements 322 may include, for instance a simple fusible link that can be blown that will affect the waveguide 370 internal to the photonic circuit 308 (or other components of the photonic circuit 308) to change the birefringence of the photonic circuit 308. As another example, non-volatile reconfigurable element 322 may include a polysilicon area or "tub" through which the waveguide 370 of the photonic circuit 308 passes, or adjacent to waveguide 308 of the photonic circuit. When such polysilicon areas are placed under heat and the heat subsequently removed, this polysilicon may refreeze with a physically different configuration. Thus, the stress and strains on the waveguide 370 of the photonic circuit 308 are altered by virtue of the refrozen polysilicon tub and, commensurately, the birefringence of the photonic circuit 308 of the PUF system 300 is likewise altered.

Similarly, volatile reconfigurable elements 322 may affect the birefringence of the photonic circuit 308 of the PUF system in a transitory manner that, in some cases may be controlled to affect the birefringence of the photonic circuit 308 differently (e.g., based on the control signal to the reconfigurable element 322). For example, these volatile reconfigurable elements 322 may include one or more heaters along one or more portions of waveguide 370 internal to the photonic circuit 308, where those heaters may be controlled to affect the birefringence of the photonic circuit 308. As another example of a volatile reconfigurable element 322, one or more variable phase shifters may be coupled in the waveguide 370 internal to the photonic circuit 380 and those variable phase shifters controlled to affect the birefringence of the photonic circuit 308 and thus (e.g., temporarily) change the polarization transfer function of the photonic circuit 308 used to generate the PUF signature 348.

Figure 4:
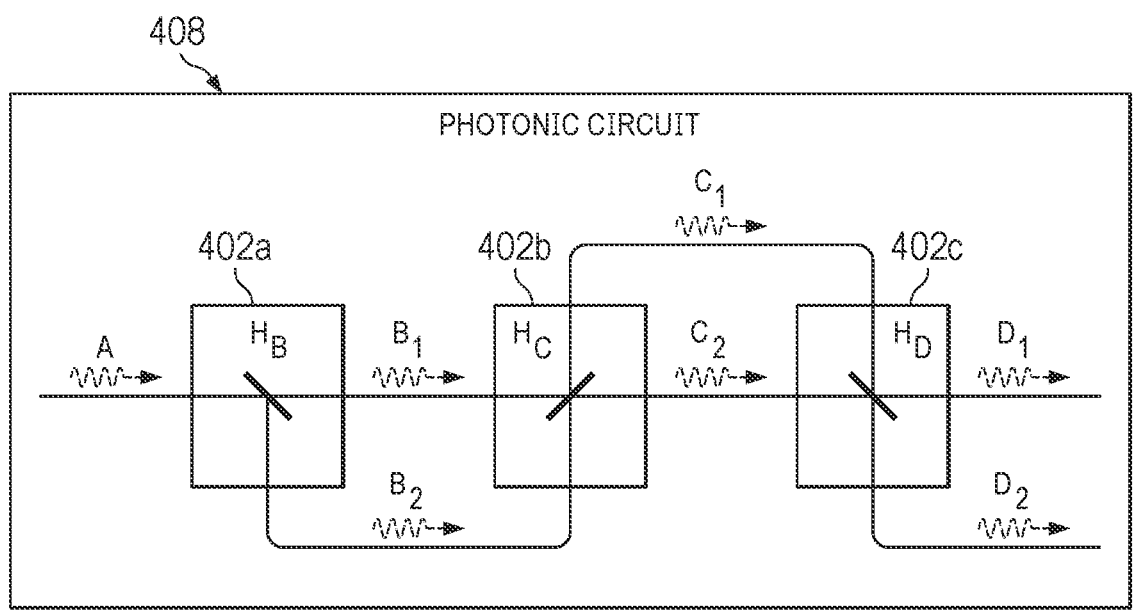
FIG. 4 is a block diagram of one embodiment of a photonic circuit for use in an embodiment of a PUF system.

Specifically, with respect to the use of variable phase shifters as a volatile reconfigurable element, as discussed in one embodiment a photonic circuit may include one or more Hadamard gates, each of which comprises a beam splitter. FIG. 4 depicts one example of an embodiment of photonic circuit 408 that may be utilized in embodiments of PUF systems as disclosed. Here, photonic circuit 408 comprises three cascaded Hadamard gates 402, where each of these Hadamard gates 402 may comprise a beam splitter. In use in a PUF system, an input signal (e.g., from a photon source through an input waveguide as discussed) may be provided to an input (or first) Hadamard gate 402a of the photonic circuit 408 and outputs 430a and 430b of output (or last) Hadamard gate 402c may serve as the outputs of the photonic circuit 408 and provided to detectors of the PUF system in which it is utilized.

Figure 5:
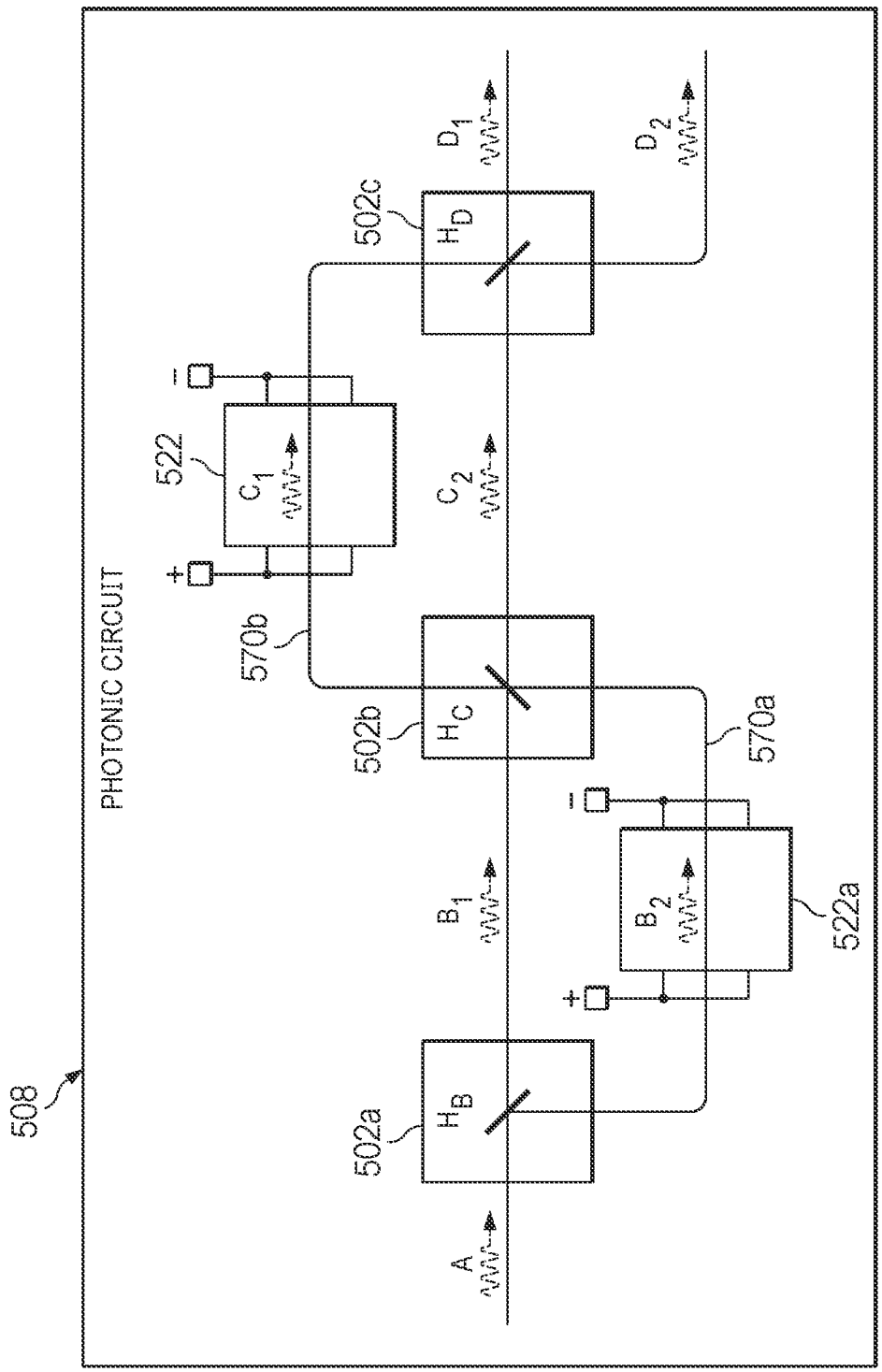
FIG. 5 is a block diagram of one embodiment of a photonic circuit for use in an embodiment of a PUF system.

Because two (e.g., cascaded) Hadamard gates may form a Mach-Zehnder Interferometer, a variable phase shift gate may be coupled between two Hadamard gates of a photonic circuit of the PUF system and this variable phase shift gate controlled to affect the birefringence of the photonic circuit and thus the PUF signature generated by the PUF system. FIG. 5 depicts one embodiment of photonic circuit 508 including three cascaded Hadamard gates 502, where each of these Hadamard gates 502 may comprise a beam splitter. Here, one or reconfigurable elements comprising a variable phase shifter 522 may be coupled in the waveguide 570 between a pair of Hadamard gates 502 of photonic circuit 508. Thus, phase shifter 522a may be coupled in portion of waveguide 570a between input Hadamard gate 502a and middle Hadamard gate 502b, or phase shifter 522b may be coupled in portion of waveguide 570b between middle Hadamard gate 502b and output Hadamard gate 502c (or both phase shifters 522a, 522b may be included). These variable phase shifters 522 may thus be controlled to affect the birefringence of the photonic circuit 508 and thus (e.g., temporarily) change the polarization transfer function of photonic circuit 508 used to generate a PUF signature when photonic circuit 508 is utilized in a PUF system.

Figure 6:
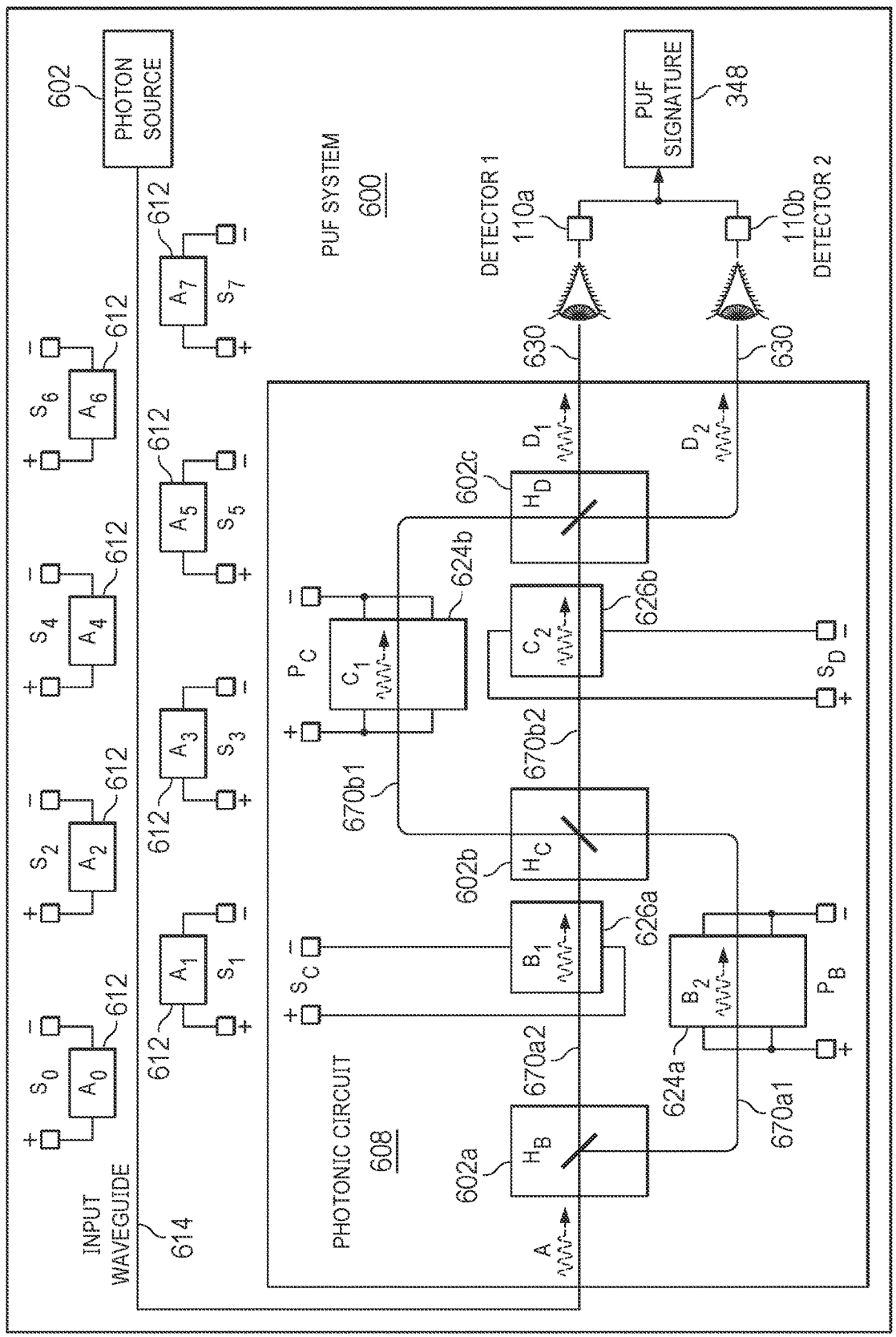
FIG. 6 is a block diagram of one embodiment of a PUF system.

Moving now to FIG. 6, one embodiment of a PUF system 600 that includes a photonic circuit 608 with configurable elements is depicted. Again, photonic circuit 608 is coupled to photon source 602. Photonic circuit 608 comprises one or more photonic components and has at least two outputs 630. A polarization controller comprising heaters 612 is disposed between the photon source 602 and the photonic circuit 608 on, or adjacent to, an input waveguide 614 adapted to conduct an optical signal (e.g., one or more photons) from the photon source 602 to the photonic circuit 608.

Here, photonic circuit 608 includes three cascaded Hadamard gates 602a, 602b, 602c, where each of these Hadamard gates 602 may comprise a beam splitter. A variable phase shifter 624a such as a polarization-based beam splitter may be coupled in the portion 670a1 of waveguide 670 between input Hadamard gate 602a and middle Hadamard gate 602b and phase shifter 624b may be coupled in portion of waveguide 670b1 between middle Hadamard gate 602b and output Hadamard gate 602c. Similarly, heater 626a such as a thermal phase modulator may be coupled in the portion 670a2 of waveguide 670 between input Hadamard gate 602a and middle Hadamard gate 602b while heater 626b may be coupled in the portion 670b2 of waveguide 670 between middle Hadamard gate 602b and output Hadamard gate 602c. These variable phase shifters 624 and heaters 626 may thus be controlled to affect the birefringence of the photonic circuit 608 and thus (e.g., temporarily) change the polarization transfer function of photonic circuit 608 used to generate PUF signature 648 in PUF system 600.

It will be noted that while almost any type of photonic circuit desired may be utilized to implement embodiments of a PUF system as disclosed, as elaborated on elsewhere herein, in certain embodiments the photonic circuit of a PUF system may comprise one or more polarizing beam splitters to generate at least two outputs for the photonic circuit. For example, in one instance the photonic circuit may comprise a chain of one or more Hadamard gates (e.g., three Hadamard gates) where those Hadamard gates are implemented as such a polarizing beam splitter.

Figure 7:
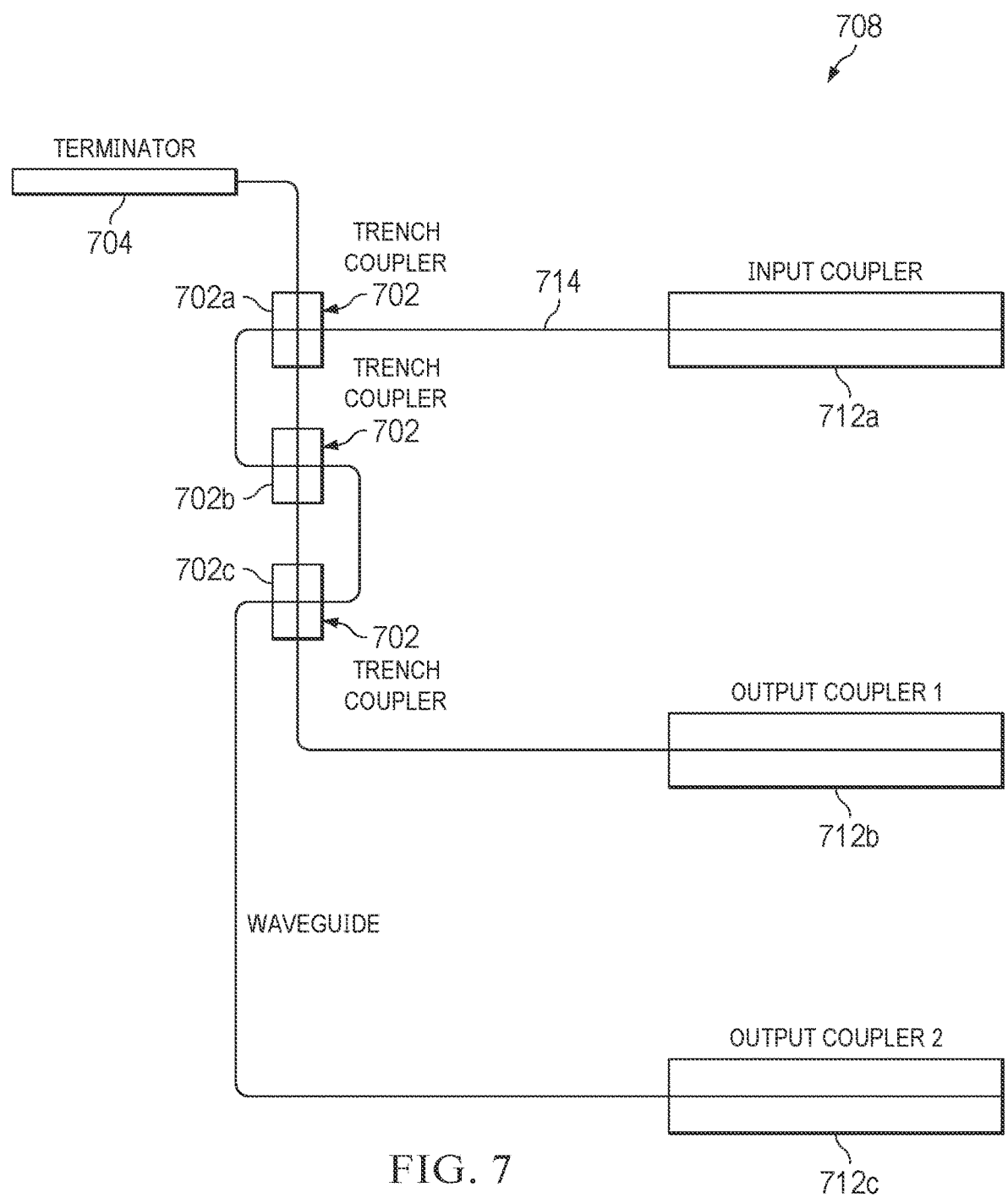
FIG. 7 is a block diagram of one embodiment of a photonic circuit.

FIG. 7 is a block diagram depicting one embodiment of a photonic circuit 708 comprising three such Hadamard gates where the photonic circuit 700 may comprise three coupled trench circuits. Specifically, light may be coupled into and out of the photonic circuit 708 using edge couplers that collect and focus light into internal waveguides of the photonic circuit. One superfluous branch 704 of the photonic circuit 708 may be internally terminated within the photonic circuit. The internal waveguides 714 connect a cascade of three of trench-based couplers 702.

During operation, an input signal is coupled into the photonic circuit 708 via an edger coupler serving as the "input coupler" 712a. The wave propagates to the first trench splitter 702a where it is split into reflected and transmitted components. These two signal components propagate into the second trench splitter 702b where recombining, reflection and transmission occurs. This process is repeated in the third trench splitter 702c and the two outputs of that component 702c propagate to two separate edge couplers 712b, 712c referred to as "output couplers." Throughout this photonic circuit 708 the propagating waves interact with fixed and repeatable perturbations caused by local stresses, strains and geometry variations in the waveguide and splitter dimensions that are implemented within a random range of values before fabrication, but that become fixed during fabrication. The recombination of the waves at the trench splitters 702 are interferometric and thus produce new SOPs resulting from the perturbations. The relative power directed to each of the two output edge couplers 712b, 712c differs (e.g., when operating in the classical domain) due to the polarizing fabrication variations within the trench splitters 712 in the photonic circuit 708 and the particular SOP of the input signal provided as input to the photonic circuit 708. Importantly, input signals with different SOPs will yield different relative powers on the two output couplers 712b, 712c.

Figure 8:
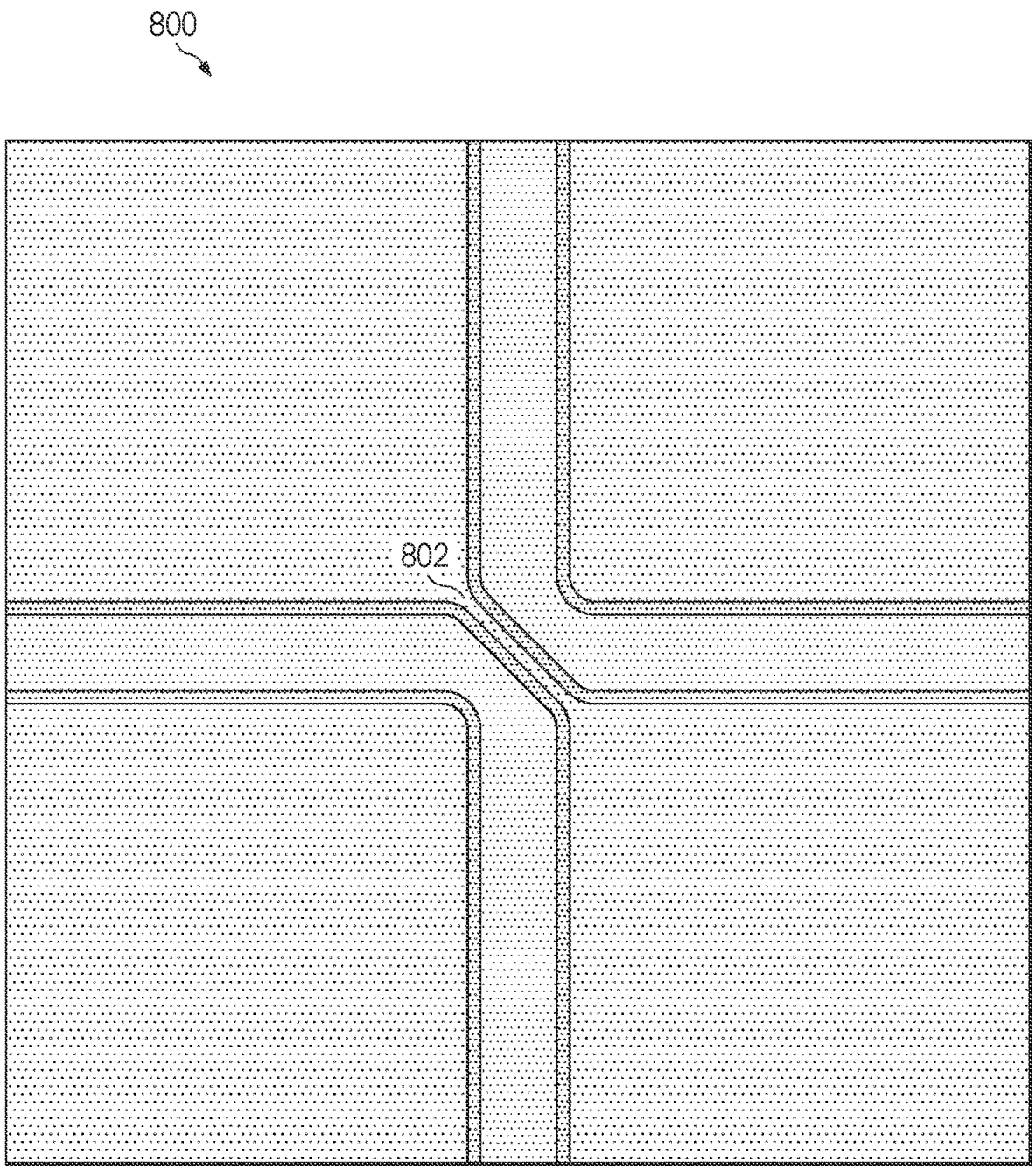
FIG. 8 is a depiction of one embodiment of a trench coupler.

Furthermore, in a particular embodiment, an embodiment of a beam splitter cell may be utilized in a trench-based coupler that adds even more variation in SOP than other common splitter cells such as those based upon Y-splitters. FIG. 8 is a depiction of such a trench base coupler 800. Here, beam splitter 800 may comprise a relatively narrow "trench" 802. The fact that trench 802 is very narrow causes the ratio of the very small geometric imperfections with respect to the narrowness of the trench to have more mode variation than would be present if the larger geometries present in a beam splitter comprising Y-splitters were to be used. This larger ratio manifests as larger variations in the optical response signal SOP resulting in a higher-quality PUF response for an embodiment of the PUF system, since SOP variation among different photonic circuits (e.g., of the same design) is increased. Such a trench-based beam splitter, or coupler, may be fabricated in a 65 nm Si process for example, where at the intersection of two waveguides, a narrow trench with a width of 100 nm is etched at a 45° angle that provides, for each input port, a reflection and a transmission of the incident optical wave to the coupler. The thin, but relatively deep trench, causes "frustrated total internal reflection" (FTIR) and transmission to occur within the coupler. This nanoscale coupler structure replicates the action of a macroscopic beam splitting cube, although it requires much less area than typical splitter cells.

Although the invention has been described with respect to specific embodiments thereof, these embodiments are merely illustrative, and not restrictive of the invention. The description herein of illustrated embodiments of the invention, including the description in the summary, is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A Physically Unclonable Function (PUF) system, comprising:
    a photon source;
    a photonic circuit coupled to the photon source via an input waveguide, the photonic circuit having a first output and a second output;
    a polarization controller responsive to a polarization input, wherein operation of the polarization controller in response to the polarization input is adapted to affect a polarization of photons on the input waveguide;
    a first detector coupled to the first output and adapted to detect a first signal on the first output, wherein the first signal is associated with a polarization state of photons on the input waveguide; and
    a second detector coupled to the second output and adapted to detect a second signal on the second output, wherein the second signal is associated with the polarization state of photons on the input waveguide, and
    wherein the PUF system is adapted to determine a PUF signature based on a difference between the first signal and the second signal.

2. The PUF system of claim 1, wherein the first signal is a presence of a photon on the first output and the second signal is the presence of the photon on the second output and determining the PUF signature comprises accumulating a first number of photons at the first output based on the first signal and accumulating a second number of photons at the first output based on the first signal and determining a ratio between the first number of photons and the second number of photons.

3. The PUF system of claim 1, wherein the first signal is a first strength of an optical signal at the first output and the second signal is a second strength of an optical signal at the second output and determining the PUF signature comprises determining a ratio between the first strength and the second strength.

4. The PUF system of claim 1, wherein the PUF system further comprises one or more reconfigurable elements adapted to alter a birefringence of the photonic circuit.

5. The PUF system of claim 4, wherein the reconfigurable element comprises a polysilicon tub.

6. The PUF system of claim 4, wherein the reconfigurable element comprises a variable phase shifter.

7. The PUF system of claim 6, wherein the photonic circuit comprises a first Hadamard gate and a second Hadamard gate and the variable phase shifter is coupled between the first Hadamard gate and the second Hadamard gate.

8. The PUF system of claim 1, wherein the polarization controller comprises one or more heaters.

9. A method for determining a Physically Unclonable Function (PUF) signature, comprising:
    providing one or more photons from a photon source to a photonic circuit coupled to the photon source via an input waveguide, the photonic circuit having a first output and a second output;
    controlling a polarization controller using a polarization input to affect a polarization of photons on the input waveguide;
    detecting a first signal on the first output of the photonic circuit, wherein the first signal is associated with a polarization state of photons on the input wavequide;
    detecting a second signal on the second output of the photonic circuit, wherein the second signal is associated with the polarization state of photons on the input waveguide; and
    determining a PUF signature based on a difference between the first signal and the second signal.

10. The method of claim 9, wherein controlling the polarization controller comprises holding the polarization input at a same level.

11. The method of claim 9, wherein the first signal is a presence of a photon on the first output and the second signal is the presence of the photon on the second output and determining a PUF signature comprises accumulating a first number of photons at the first output based on the first signal and accumulating a second number of photons at the first output based on the first signal and determining a ratio between the first number of photons and the second number of photons.

12. The method of claim 9, wherein the first signal is a first strength of an optical signal at the first output and the second signal is a second strength of an optical signal at the second output and determining the PUF signature comprises determining a ratio between the first strength and the second strength.

13. The method of claim 9, further comprising altering a birefringence of the photonic circuit.

14. The method of claim 13, wherein altering the birefringence comprises heating a polysilicon tub in the photonic circuit.

15. The method of claim 13, wherein altering the birefringence comprises controlling a variable phase shifter in the photonic circuit.

16. The method of claim 9, wherein the photonic circuit comprises a first Hadamard gate and a second Hadamard gate and the variable phase shifter is coupled between the first Hadamard gate and the second Hadamard gate.

17. The method of claim 9, wherein the polarization controller comprises one or more heaters.

18. The method of claim 17, wherein the polarization input is a voltage.

19. A Physically Unclonable Function (PUF) system, comprising:
    a photon source;
    a photonic circuit coupled to the photon source via an input waveguide, the photonic circuit having a first output and a second output;
    a polarization controller responsive to a polarization input, wherein the operation of the polarization controller in response to the polarization input is adapted to affect the polarization of photons on the input waveguide;
    a first detector coupled to the first output and adapted to detect a first signal on the first output, wherein the first signal is associated with a polarization state of photons on the input waveguide; and a second detector coupled to the second output and adapted to detect a second signal on the second output, wherein the second signal is associated with the polarization state of photons on the input waveguide, wherein the PUF system is adapted to:

determine the PUF signature at a first time by providing a first polarization input to the polarization controller at the first time, detecting the first signal at the first time, detecting the second signal at the first time and determining the PUF signature based on a difference between the first signal at the first time and the second signal at the first time, and determine the PUF signature at a second time by providing the first polarization input to the polarization controller at the second time, detecting the first signal at the second time, detecting the second signal at the second time and determining the PUF signature based on the difference between the first signal at the second time and the second signal at the second time.

* * * * *